United States Patent [19]

Heathe

[11] Patent Number: 4,518,205
[45] Date of Patent: May 21, 1985

[54] SLIDING BEARING

[75] Inventor: William R. Heathe, Weston, Canada

[73] Assignee: Baxter Technologies Inc., Bloomfield Hills, Mich.

[21] Appl. No.: 550,811

[22] Filed: Nov. 14, 1983

[30] Foreign Application Priority Data

Jun. 3, 1983 [CA] Canada ............................. 429681

[51] Int. Cl.³ ............................................. F16C 29/12
[52] U.S. Cl. .................................. 308/3 R; 308/4 R
[58] Field of Search .................. 308/3 R, 3 A, 4 R; 384/300, 222, 273

[56] References Cited

U.S. PATENT DOCUMENTS

| 244,192 | 7/1881 | Crandal | 384/273 |
|---|---|---|---|
| 602,287 | 4/1898 | Green | 384/273 |
| 2,851,314 | 9/1958 | Thomson | 384/222 |
| 3,009,746 | 11/1961 | Hanshalter | 384/222 |
| 3,095,247 | 6/1963 | Zelewsky | 368/3 |
| 3,353,879 | 11/1967 | Jörn | |
| 3,424,065 | 1/1969 | Kurt et al. | 384/222 |
| 3,424,503 | 1/1969 | Schulz | 384/222 |
| 3,995,914 | 12/1976 | Schardt et al. | 308/3 R |
| 4,088,378 | 5/1978 | Pallant | 308/3 R |
| 4,218,933 | 8/1980 | Allen et al. | 74/422 |
| 4,238,138 | 12/1980 | Demorieux | 308/3 R |

Primary Examiner—Lenard A. Footland

[57] ABSTRACT

A compliant bearing assembly for use in a precision slide is constructed so as to permit fine adjustment of engagement between a sliding bearing member and a shaft so as to effect minimum clearance and minimize vibration. The bearing member comprises a resilient arcuate plate or sleeve or a plurality of resilient plates, the or each plate being backed by an isotropic elastomeric medium confined between abutment stops. One of the abutment stops is adjustable for varying the displacement of the medium, thereby to displace the resilient plate inwardly against the shaft.

20 Claims, 7 Drawing Figures

4,518,205

SLIDING BEARING

BACKGROUND OF THE INVENTION

This invention relates to sliding bearings for use in precision slides such as are employed, for example, in precision machine tools such as engine lathes.

In a precision slide in which a slide member is constrained by one or more longitudinal guide shafts to be moved along a rectilinear path the slide member is commonly mounted on bearings which engage the shafts to facilitate the smooth rectilinear movement of the slide. Typically, each bearing assembly comprises a bearing block having an internal passageway through which the shaft extends and housing one or more bearing sleeves lined with antifriction material, the bearing sleeve or sleeves being a press fit in the housing. It is necessary to keep the clearance between the relatively sliding surfaces of the sleeve or sleeves and the shaft to a minimum, in order to ensure accurate rectilinear movement of the slide, but with the current practice it is impossible to reduce the clearance to zero and so there is a limit to the accuracy which can be achieved. Alternatively, ball bearing assemblies have been employed for the purpose, but apart from the matter of cost, such assemblies have the disadvantage of low load capacity and high starting friction due to dust seals which make it difficult to control the movement of the slide accurately.

SUMMARY OF THE INVENTION

It is an object of the present invention to provide an improved sliding bearing in which the above-mentioned difficulties are overcome. This is achieved in one embodiment by providing, instead of a tubular bearing sleeve which is a press fit into the housing, a resilient split sleeve which may be urged into zero clearance conformity with the shaft surface by a radially inward displacement of the split sleeve caused by urging the elastomeric backing member in a direction transverse to its radial thickness. In second and third alternative embodiments, an arcuate resilient bearing plate and one or more flat bearing plates, respectively, replace the resilient split sleeve. The elastomeric medium is confined between abutment members, at least one of which is adjustable for variably urging the medium so as to vary said displacement and thereby adjust the clearance between the relatively sliding surfaces to values between zero and any desired amount.

Thus according to one aspect of the present invention there is provided in a precision slide comprising a linear shaft defining a longitudinal axis and a slide member constrained thereby to be moved longitudinally, a bearing assembly comprising a bearing block having an axially extending cavity defining a passageway through which the shaft extends, the cavity having a wall arranged coaxially with the shaft, a resilient bearing member within the cavity, the bearing member having an internal bearing surface in cooperative sliding engagement with the shaft and an external surface spaced radially from the cavity wall, an elastomeric medium substantially filling the space between the sleeve and the cavity wall, said elastomeric medium being urgable in a direction transverse to its thickness so as to cause an inward movement of said internal bearing surface, and means for adjustably displacing the elastomeric medium in said transverse direction for adjustably varying the clearance between said internal bearing surface and the shaft.

The cavity defining the passageway may be formed as a cylindrical bore, in which case it is preferable that the elastomeric medium be urged by the adjustable abutment member in the axial direction. In an alternate embodiment, the cavity may be formed as an axially extending channel, in which case the split sleeve will take the form of an arcuate resilient bearing plate, and the urging of the elastomeric backing medium by the adjustable abutment member will be in the circumferential direction. In a third alternate embodiment the cavity may be formed as an axially extending channel having at least one flat channel wall in generally parallel alignment with a generally flat bearing plate, and the urging of the elastomeric backing medium by the adjustable abutment member being in a direction parallel to the flat channel wall, that is, in a direction transverse to the thickness of the elastomeric medium and the bearing plate.

BRIEF DESCRIPTION OF THE DRAWINGS

In order that the invention may be readily understood, three embodiments thereof will now be described, by way of example, with reference to the accompanying drawings. In the drawings.

DESCRIPTION OF THE PREFERRED EMBODIMENTS

Figure 1:
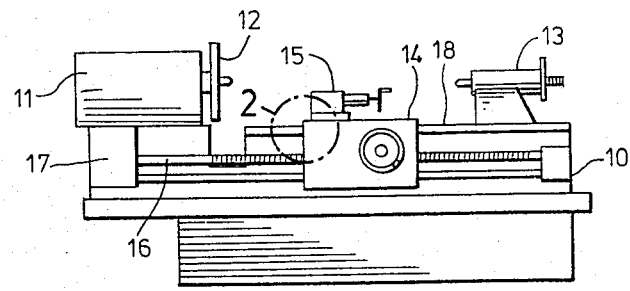
FIG. 1 is a simplified view of an engine lathe, representing one example of a machine tool to which the invention may be applied.

FIG. 1 shows a conventional engineer's lathe, the figure showing particularly the lathe bed 10, headstock 11 with faceplate 12, tailstock 13 and saddle 14 carrying a cross-slide 15. The saddle 14 is driven by a lead-screw 16, driven from a gearbox 17, and is constrained by a pair of parallel guide shafts 18, to move along a fixed rectilinear path. The saddle is mounted on slide bearings, one such bearing being located for example in the region indicated by the circle 2. Three examples of suitable slide bearings are illustrated in the subsequent figures of the drawings.

Figure 2:
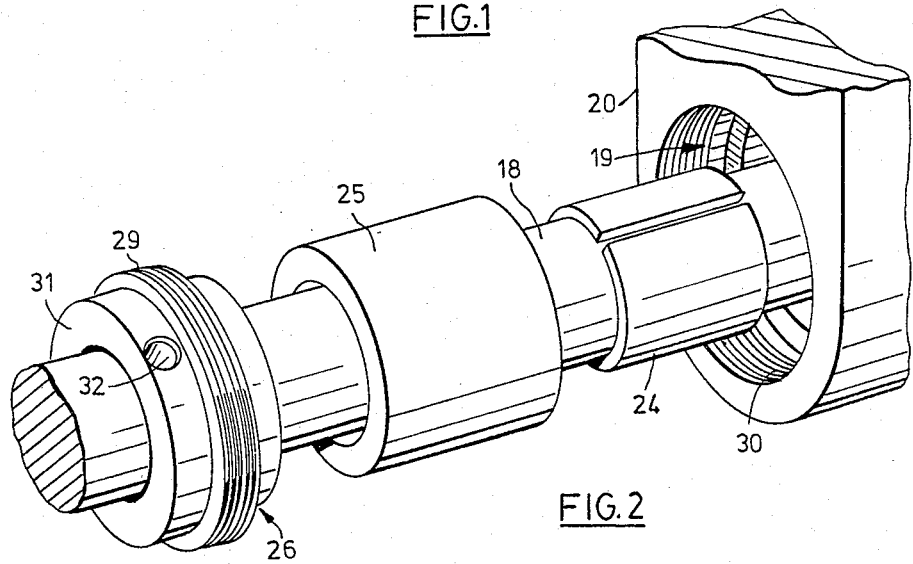
FIG. 2 is an exploded view showing the component parts of a bearing assembly in accordance with the first embodiment of the invention.
Figure 3:
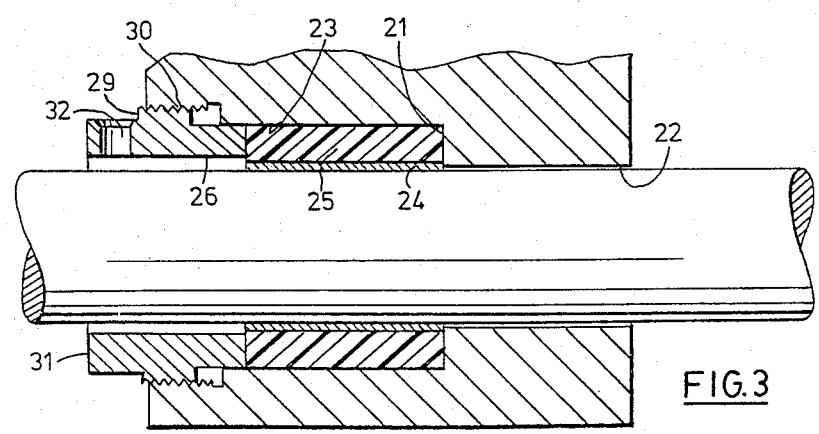
FIG. 3 is a longitudinal sectional view of the first bearing assembly.

Referring to FIGS. 2 and 3, the first bearing assembly comprises a bearing block 20 having a cylindrical bore 19 through which the guide shaft 18 extends. The wall of the bore is formed with an annular step 21, serving as an abutment stop as hereinafter described, so as to provide a first cylindrical wall portion 22 which is a sliding fit on the shaft 18, and a second cylindrical wall portion 23 of larger diameter, both wall portions being arranged coaxially with the shaft 18. Located on the shaft 18 within the cavity defined by the second wall portion 23 is a bearing member consisting of a resilient split sleeve 24. The sleeve 24 is of steel having an internal bearing surface lined with antifriction material such as tetrafluoroethylene, the internal bearing surface being maintained in cooperative sliding engagement with the shaft. The external surface of the split sleeve is spaced radially inwardly from the wall portion 23.

The annular space between the sleeve 24 and the wall portion 23 is substantially filled with an elastomeric medium. The elastomeric medium takes the form of a tubular sleeve 25 of isotropic elastomeric material such as solid urethane. The elastomeric sleeve 25 can be urged in the axial direction, that is, in a direction transverse to its radial thickness, to cause radially inward displacement of the elastomeric medium of the sleeve 25 with resultant radially inward movement of the internal bearing surface of the resilient split sleeve 24. As shown in FIG. 3, the elastomeric sleeve 25 is confined axially between the annular face 21 and the face of an annular plunger 26, which serves as a second abutment stop.

The plunger 26 has an externally threaded flange portion 29 which is in screw-threaded engagement with an internally threaded wall portion 30 at the end of the cylindrical bore 19. The plunger 26, which projects into the annular space between the wall portion 23 and the bearing sleeve 24, can thus be adjusted axially by being rotated, for which purpose an externally accessible part 31 of the plunger provides keying means 32 for engagement by a suitable key. The plunger 26 is thus axially adjustable so as to vary the urging of the elastomeric medium, thereby to vary the displacement of the internal surface of the sleeve 24, and so as to thereby vary in a controlled manner the clearance of engagement between the resilient split sleeve and the shaft.

Figure 4:
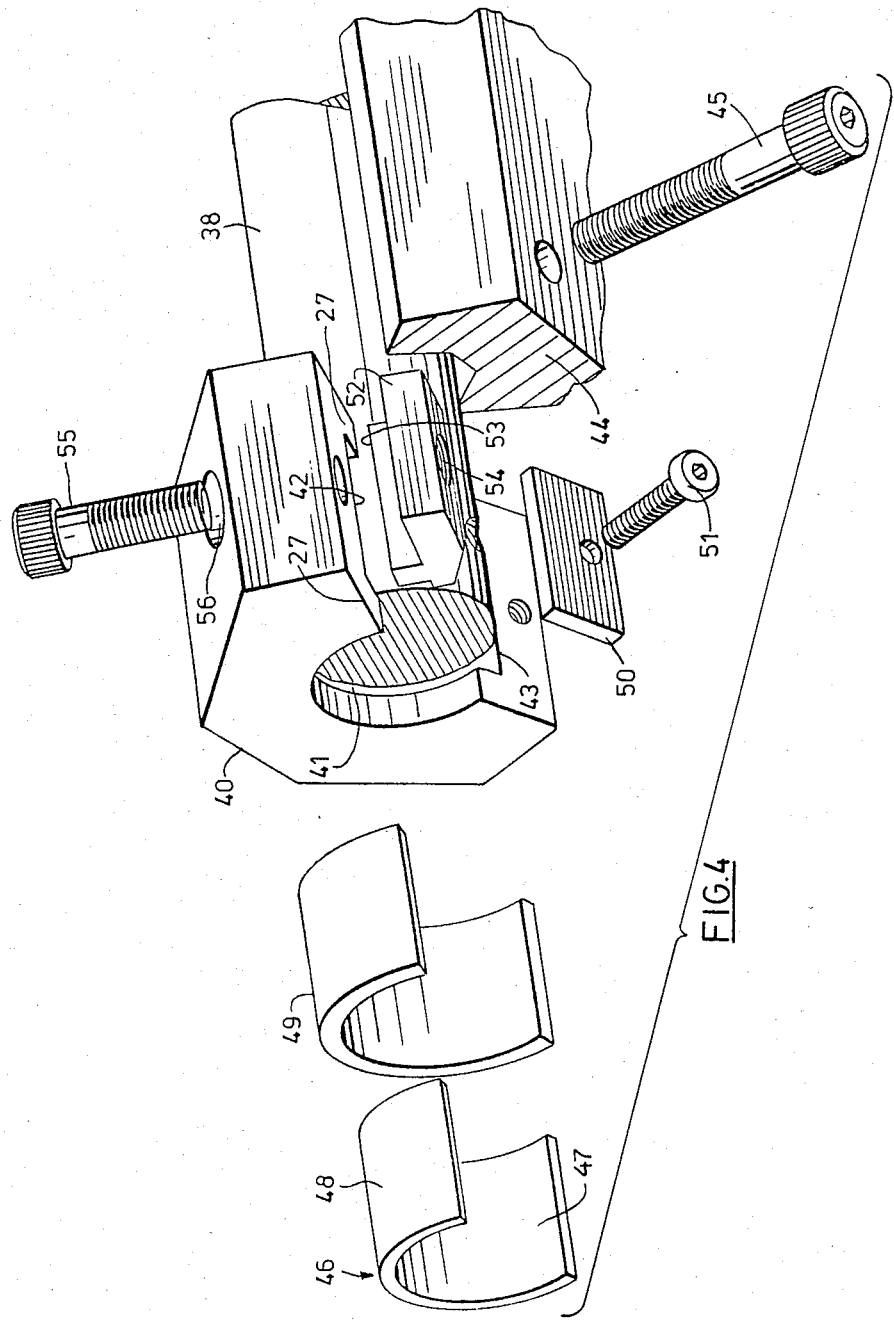
FIG. 4 is an exploded view showing the components of a bearing assembly in accordance with a second embodiment of the invention.
Figure 5:
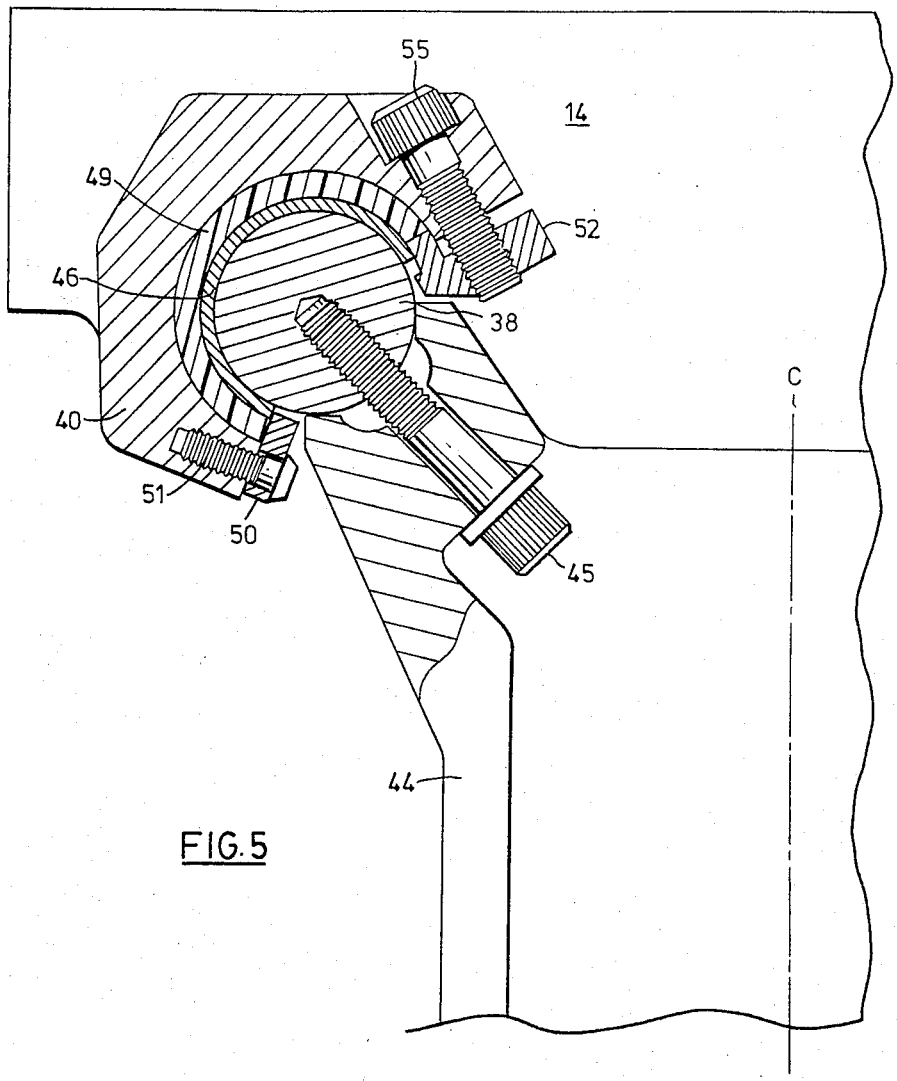
FIG. 5 is a cross-sectional view of the assembly shown in FIG. 4.

Referring to FIGS. 4 and 5, the second bearing assembly is suitable where the saddle 14 is constrained by a pair of parallel guide shafts disposed symmetrically on either side of a centre line C. In the figures only one of the guide shafts 38 is shown, in order to illustrate the associated bearing assembly in greater detail, the two bearing assemblies being of the same type.

Each bearing assembly comprises a bearing block 40 formed with an axially extending open channel 41 defining a passageway through which the shaft 38 extends. The channel has a cylindrical wall extending for more than 180° of arc from one longitudinal edge 42 to the other longitudinal edge 43, the edges 42, 43 defining the mouth of the channel. The cylindrical wall is coaxial with the shaft 38. As illustrated in FIG. 5, the shaft 38 is secured to the machine frame 44 by bolts 45 which are positioned so as to extend into the mouth of the channel and so as not to interfere with the bearing.

Located within the channel is a bearing member 46 in the form of an arcuate resilient bearing plate, preferably of steel. The member 46 has a concave internal bearing surface 47 coated with a film of antifriction material such as tetrafluoroethylene, and a convex external surface 48 spaced radially from the cylindrical wall of the channel. The bearing member 46 does in fact form part of a cylinder arranged coaxially with the channel wall and extending for about the same length of arc.

An elastomeric medium, in this case a partial ring of solid urethane 49 is interposed between the wall of the channel 41 and the bearing member 46, substantially filling the radial space between them. The elastomeric medium 49 is urgable in a direction transverse to its thickness so as to cause a radially inward displacement of the elastomeric medium 49 with a resulting inward collapsing movement of the internal surface 47 of the resilient bearing member 46. The elastomeric medium 49 is confined between opposed abutment members, namely a first abutment member constituted by a plate 50 which is bolted to the bearing block 40 by a bolt 51 so as to extend along the channel edge 43 in overlapping relation thereto, and a second abutment member constituted by a plate 52. The elastomeric medium 49 is also axially confined by the end flanges 27 of bearing block 40. The plate 52 is adjustably secured to the bearing block 40 so as to extend along the opposite edge 42 of the channel 41 in overlapping relation thereto. The plate 52 is formed with a transverse lip portion 53 which serves as a plunger which projects into the mouth of the channel to engage one longitudinal edge of the elastomeric medium 49. For adjustably positioning the plunger within the channel, so as to vary the urging of the elastomeric medium and thereby adjust the clearance of the bearing member on the shaft, the plate 52 is formed with a threaded hole 54 which engages an adjusting screw 55 mounted in a locating bore 56 of the bearing block 40. Thus, in the present example, the elastomeric medium 49 is confined between flanges 27 and between opposed circumferentially spaced abutment members 50, 53, the latter abutment member being adjustable so as to urge the elastomeric medium circumferentially so as to vary the clearance between the bearing member 46 and the shaft 38.

Figure 6:
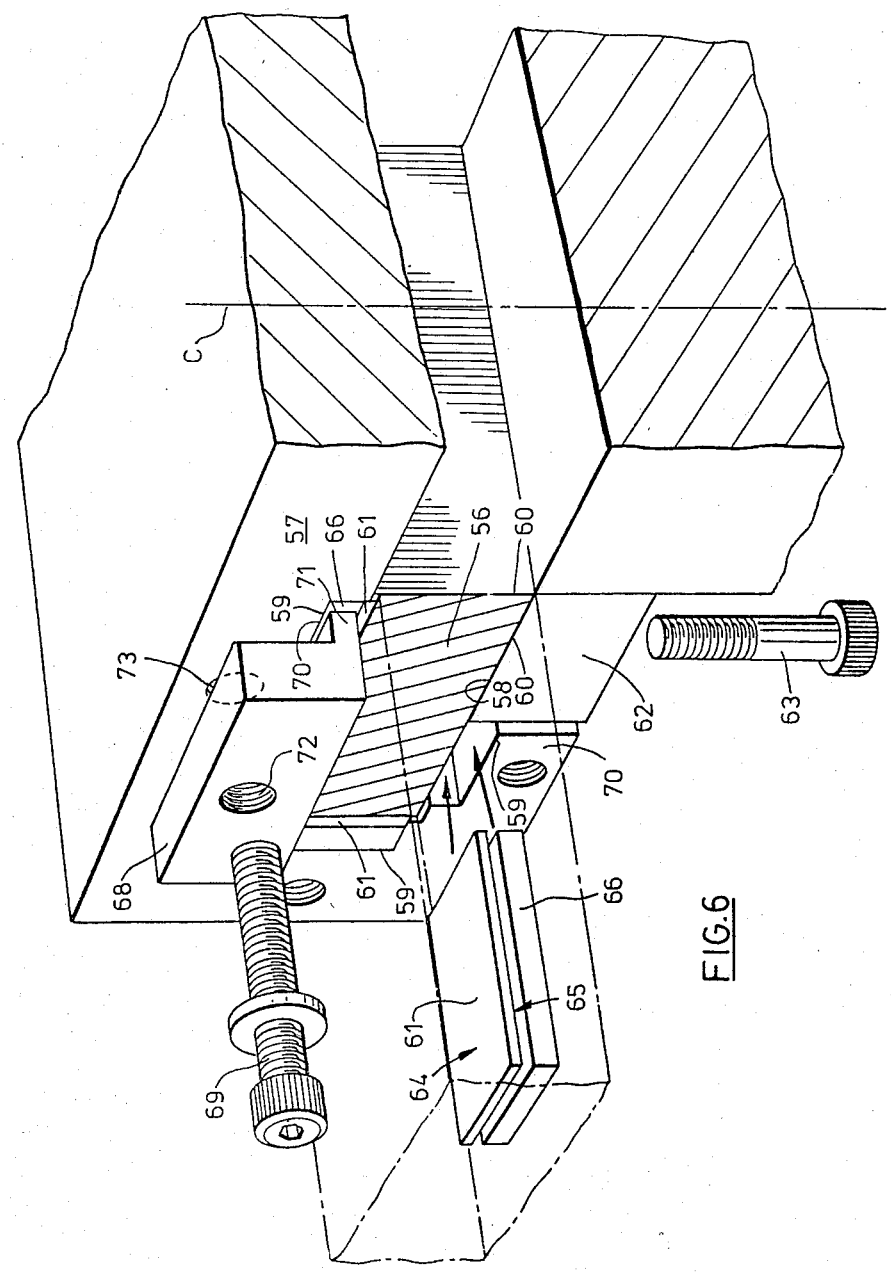
FIG. 6 is an exploded view showing the components of a bearing assembly in accordance with a third embodiment of the invention.
Figure 7:
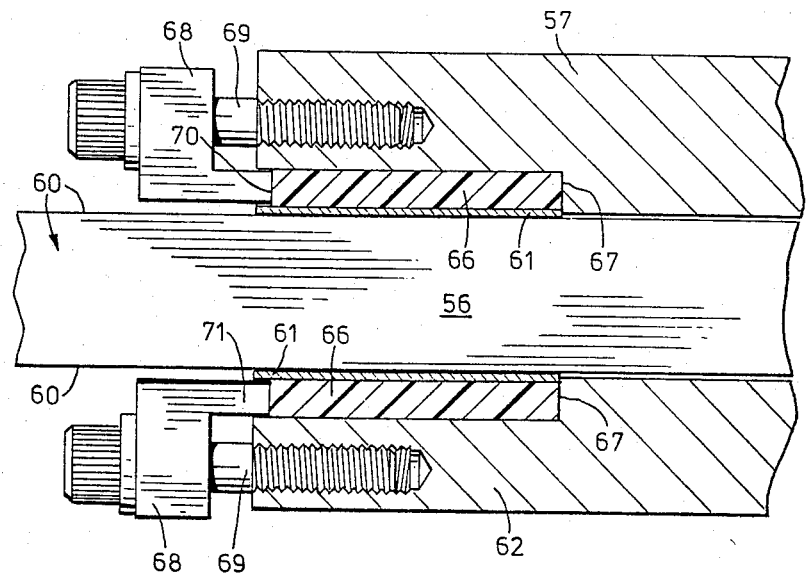
FIG. 7 is a cross-sectional view of the assembly of FIG. 6.

Referring to FIGS. 6 and 7, the third bearing assembly is suitable where the saddle is constrained by a pair of parallel guide shafts of uniform non-circular cross-section disposed symmetrically on either side of centre line C. In the figures, only one of the guide shafts 56, having a generally rectangular cross-section, is shown in order to illustrate the associated bearing assembly in greater detail, the two bearing assemblies being of the same type. While a guide shaft 56 of rectangular cross-section is shown and such shafts are commonly used in lathe construction, this aspect of the invention is not limited to rectangular guide shafts, but encompasses all guide shafts of uniform cross-section having at least one planar surface parallel to the longitudinal axis of the shaft, which planar surface is in cooperative sliding engagement with a bearing member.

The bearing assembly illustrated comprises a bearing block 57 formed with an axially extending channel 58 defining a passageway through which the shaft 56 extends. The channel shown has three flat channel walls 59 each arranged at right angles to the adjacent wall, and each being arranged in substantially parallel spaced relationship with the corresponding flat planar surface 60 of the shaft 56. As illustrated in FIG. 6, the shaft 56 is secured to the machine frame 62 by bolts 63 which are positioned so as to extend into the mouth of the channel 58 and so as not to interfere with the bearing.

Located within the channel adjacent each channel wall 59 is a resilient bearing member 61 in the form of a generally flat bearing plate, preferably of steel. The bearing member 61 has a flat internal bearing surface 64 in parallel cooperative sliding engagement with the planar surface 60 and a flat external surface 65 arranged in parallel spaced relationship to planar surface 60. The internal bearing surface 64 may be coated with a film of antifriction material such as tetrafluoroethylene.

An elastomeric medium, in this embodiment a substantially flat sheet of solid urethane 66, is interposed between the channel wall 59 and the external surface 65 of the bearing member 61, substantially filling the space therebetween. The elastomeric medium 66 is urgable in a direction transverse to its thickness, that is, parallel to planar surface 60 so as to cause displacement of the elastomeric medium 66 in a direction transverse to the planar surface 60 with resultant movement of the bearing member 61, including the internal bearing surface 64, in a direction transverse to the planar surface 60.

As shown in FIGS. 6 and 7, the elastomeric medium 66 is confined between opposed abutment members, namely a first abutment member constituted by a plate 68 which is adjustably secured to bearing block 57 by an adjusting screw 69, so as to extend along the end edge 70 of the channel in overlapping relation thereto, and a second abutment member formed by step 67. The plate 68 is formed with a transverse lip portion 71 which serves as a plunger which projects into the mouth of the channel to engage one edge of the elastomeric medium 66. For adjustably positioning the plunger within the channel, so as to adjustably urge the elastomeric medium in a direction parallel to the planar surface 60, plate 68 is provided with a threaded hole 72 which engages the adjusting screw 69 mounted in a locating bore 73 of the bearing block 57. Thus, in this third example, the elastomeric medium 66 is confined between opposed abutment members 67 and 68, the latter abutment member constituting, with the adjustment screw 69, threaded hole 72 and locating bore 73, means for adjustably urging the elastomeric medium in said parallel direction for adjustably varying the clearance between the internal bearing surface 64 and the planar surface 60 of guide shaft 56.

Throughout this disclosure the term elastomeric medium is given to mean any elastomeric medium which is substantially non-compressible. Substantial non-compressibility is an essential feature of the elastomeric medium in order to ensure that the bearing member moves in the manner indicated in response to adjustment of the variable adjustment stop.

While three specific examples of the present invention are herein shown and described, it will be understood that various changes in size, shape and arrangement of parts may be made without departing from the spirit of the invention. For example, the fixed abutment members 21, 50 and 67 may be replaced with a second adjustable abutment stop having a design corresponding to the first adjustable abutment stop of the respective embodiment. In the first and third embodiments described, such adaptation would necessitate the longitudinal extension of the cavity or channel at its full depth completely through the bearing block, with one adjustable abutment stop positioned at each end thereof.

What I claim is:

1. In a precision slide comprising a linear shaft defining a longitudinal axis and a slide member constrained thereby to be moved longitudinally, a bearing assembly comprising a bearing block having an axially extending cavity defining a passageway through which the shaft extends, the cavity having a wall arranged coaxially with the shaft, a resilient bearing member within the cavity, the bearing member having an internal bearing surface in cooperative sliding engagement with the shaft and an external surface spaced from the cavity wall, an elastomeric medium substantially filling the space between the external surface and the cavity wall, said elastomeric medium being urgable in a direction transverse to its thickness so as to cause an inward movement of said internal bearing surface and means for adjustably urging the elastomeric medium in said transverse direction for adjustably varying the clearance between said internal bearing surface and the shaft.

2. A precision slide according to claim 1, wherein said means for adjustably urging the elastomeric medium comprises first and second opposed abutment means confining the elastomeric medium within the cavity, one of said abutment means defining a fixed abutment stop against which the elastomeric medium bears and the other abutment means comprises a plunger mounted on the bearing block and extending into said cavity, the plunger being adjustable with respect to the bearing block for urging the elastomeric medium in said transverse direction.

3. In a precision slide comprising a linear shaft defining a longitudinal axis and a slide member constrained thereby to be moved longitudinally, a bearing assembly comprising a bearing block having an axially extending cylindrical bore defining a passageway through which the shaft extends, the bore having a cylindrical wall arranged coaxially with the shaft, a bearing member within the bore, the bearing member comprising a resilient split sleeve having an internal bearing surface in cooperative sliding engagement with the shaft, and an external surface spaced radially from said wall, an elastomeric medium substantially filling the annular space between the sleeve and said wall, said elastomeric medium being urgable in the axial direction thereby to cause a radially inward movement of said internal bearing surface of the sleeve, and means for adjustably urging the elastomeric medium in said axial direction for adjustably varying the clearance between said resilient split sleeve and the shaft, said clearance being variable from zero to a desired amount.

4. A precision slide according to claim 3, wherein the split sleeve is a metallic sleeve lined with antifriction material.

5. A precision slide according to claim 4, wherein the sleeve is lined with a film of tetrafluoroethylene.

6. A precision slide according to claim 5, wherein the elastomeric medium is constituted by a tubular sleeve of elastomeric material.

7. A precision slide according to claim 6, wherein said cylindrical wall of the bore is formed with an annular step defining an abutment stop, and wherein said means for adjustably urging the elastomeric sleeve comprises an annular plunger mounted on the block and projecting into said annular space coaxially with the step, the elastomeric sleeve being confined between the plunger and the abutment stop, and the plunger being axially adjustable for urging the elastomeric sleeve.

8. A precision slide according to claim 7, wherein the plunger has an externally threaded flange portion in threaded engagement with an internally threaded end portion of said cylindrical wall, the plunger providing externally accessible engagement means for effecting rotation of the plunger to effect said axial adjustment.

9. A precision slide according to claim 8, wherein the resilient split sleeve is a metallic sleeve lined with antifriction material.

10. A precision slide according to claim 9, wherein the internal surface of the sleeve is lined with a film of tetrafluoroethylene.

11. A precision slide according to claim 6, wherein the elastomeric sleeve is of solid urethane.

12. In a precision slide comprising a linear shaft defining a longitudinal axis and a slide member constrained thereby to be moved longitudinally, a bearing assembly comprising a bearing block formed with an axially extending channel defining a passageway through which the shaft extends, the channel having a cylindrical wall arranged coaxially with the shaft, a bearing member within the channel, the bearing member comprising an arcuate resilient bearing plate having a concave internal bearing surface in cooperative sliding engagement with the shaft and a convex external surface spaced radially from said wall, an elastomeric medium substantially filling the space between the resilient plate and said wall, said elastomeric medium being urgable in a direction transverse to its radial thickness so as to cause a radially inward displacement of the elastomeric medium and a resulting inward movement of said external surface of the resilient plate, said elastomeric medium being confined between opposed abutment members extending along opposite longitudinal edges of said channel and bearing on respective opposite edges of the elastomeric medium, one said abutment member providing a plunger lip extending into the channel, and means for adjustably positioning said one abutment member whereby to vary the urging of the elastomeric medium in said transverse direction for varying the clearance between the bearing member and the shaft.

13. A precision slide according to claim 12, wherein the concave internal surface of the resilient plate is lined with tetrafluoroethylene.

14. A precision slide according to claim 12, wherein the elastomeric medium is a partial ring of urethane.

15. In a precision slide comprising a linear shaft defining a longitudinal axis and having at least one planar surface parallel to said axis and a slide member constrained thereby to be moved longitudinally, a bearing assembly comprising a bearing block having an axially extending channel defining a passageway through which the shaft extends, the channel having a generally flat channel wall arranged in substantially parallel spaced relationship with said planar surface, a bearing member comprising a generally flat bearing plate having an internal bearing surface in cooperative sliding engagement with said planar surface and an external surface in substantially parallel spaced relationship to said planar surface, an elastomeric medium substantially filling the space between said external surface and said cavity wall, said elastomeric medium being urgable in a direction parallel to said planar surface, so as to cause an inward transverse movement of said internal bearing surface, and means for adjustably urging the elastomeric medium in said parallel direction for adjustably varying the clearance between said internal bearing surface and said planar surface.

16. A precision slide according to claim 15, wherein the linear shaft has a substantially rectangular cross-section.

17. A precision slide according to claim 16, wherein the bearing plate is lined on its internal surface with a film of tetrafluoroethylene.

18. A precision slide according to claim 15, wherein said means for adjustably urging the elastomeric medium comprises first and second opposed abutment means confining the elastomeric medium within the cavity, one of said abutment means defining a fixed abutment stop against which the elastomeric medium bears and the other abutment means comprising a plunger mounted on the bearing block and extending into said cavity, the plunger being adjustable with respect to the bearing block for urging the elastomeric medium in said parallel direction.

19. A precision slide according to claim 15, wherein the elastomeric medium is a substantially flat sheet of solid urethane.

20. In a precision slide comprising a linear shaft defining a longitudinal axis and a slide member constrained thereby to be moved longitudinally, a bearing assembly comprising a bearing block having an axially extending cavity defining a passageway through which the shaft extends, a resilient bearing member within the cavity, the bearing member having an internal bearing surface in cooperative sliding engagement with the shaft and an external surface spaced from an internal wall of the cavity, an elastomeric medium substantially filling the space between the external surface and said internal cavity wall, said elastomeric medium being urgable in a direction transverse to its thickness so as to cause an inward movement of said internal bearing surface and means for adjustably urging the elastomeric medium in said transverse direction for adjustably varying the clearance between said internal bearing surface and the shaft.

* * * * *